United States Patent [19]

Kobayashi

[11] Patent Number: 5,087,993
[45] Date of Patent: Feb. 11, 1992

[54] MAGNETIC RECORDING AND REPRODUCING APPARATUS WITH ADJUSTABLE CAPSTAN SPEED

[75] Inventor: Junji Kobayashi, Tokyo, Japan

[73] Assignee: Canon Kabushiki Kaisha, Tokyo, Japan

[21] Appl. No.: 513,214

[22] Filed: Apr. 23, 1990

[30] Foreign Application Priority Data

May 1, 1989 [JP] Japan .................................. 1-109076

[51] Int. Cl.$^5$ ............................................ G11B 15/46
[52] U.S. Cl. ................................... 360/73.05; 360/71; 360/73.01; 360/74.2
[58] Field of Search ............... 360/73.01, 73.02, 73.05, 360/69, 74.2, 71

[56] References Cited

U.S. PATENT DOCUMENTS 4,521,815  6/1985  Tokuyama ....................... 360/73.05
4,989,112  1/1991  Hamoda ........................... 360/73.01

FOREIGN PATENT DOCUMENTS 63-78359   4/1988  Japan ................................. 360/73.01
63-96762   4/1988  Japan ................................. 360/73.01
63-112851  5/1988  Japan ................................. 360/73.01
1-138645   5/1989  Japan ................................. 360/73.01
63-296450 11/1989  Japan ................................. 360/73.01

Primary Examiner—John H. Wolff
Attorney, Agent, or Firm—Robin, Blecker, Daley & Driscoll

[57] ABSTRACT

A magnetic recording and reproducing apparatus is arranged to be loaded with a supply reel and a take-up reel with a magnetic tape wound around them, to move the tape from the supply reel to the take-up reel by driving and rotating forward the two reels and a capstan with the tape pushed into contact with the capstan and to rewind the tape moving it from the take-up reel back to the supply reel by driving and rotating these reels and the capstan backward. The apparatus is provided with means for detecting the rotating speed of the supply reel in rewinding the tape; and control means for controlling and changing the rotation speed of the capstan according to the detected rotating speed of the supply reel during the process of rewinding the tape.

17 Claims, 3 Drawing Sheets

MAGNETIC RECORDING AND REPRODUCING APPARATUS WITH ADJUSTABLE CAPSTAN SPEED

BACKGROUND OF THE INVENTION

1. Field of the Invention

This invention relates to a magnetic recording and reproducing apparatus for magnetic recording or reproduction of information on or from a magnetic tape. More particularly, the invention relates to an apparatus of the kind arranged to be loaded with a supply reel having the magnetic tape wound around it and a take-up reel; to transport the magnetic tape from the supply reel to the take-up reel by driving and rotating forward the two reels and a capstan with the tape pushed into contact with the capstan; and to rewind the tape by moving it from the take-up reel back onto the supply reel by driving them backward.

2. Description of the Related Art

The magnetic recording and reproducing apparatuses of the above-stated kind include the video tape recorder which is called a VTR for short. The VTR is arranged to use a magnetic tape cassette (hereinafter referred to as the cassette for short). The cassette contains therein a supply reel and a take-up reel with a magnetic tape spanned and wound between and around them. In recording or reproduction, a part of the magnetic tape is pulled out from the cassette and is wrapped around a drum which has magnetic heads arranged to rotate along with the periphery thereof. With the VTR loaded with the tape in this manner, recording or reproduction is performed with the tape transported from the supply reel to the take-up reel by driving and rotating a capstan while the tape is pushed into contact with the capstan.

Before or after the recording or reproducing operation, the magnetic tape is rewound by moving the tape from the take-up reel to the supply reel as necessary. This tape rewinding action is performed by driving the capstan and the supply reel to rotate backward with the VTR left in a state of being loaded with the cassette, particularly in the case of a compact 8-mm VTR or the like. The tape rewinding action of the VTR has heretofore been arranged to be performed by setting the capstan driving and rotating speed at a given constant speed. However, this has presented a problem as described below:

FIG. 1 of the accompanying drawings shows relations obtained, during the process of tape rewinding by the above-stated VTR, among a speed at which the magnetic tape is rewound by moving it from the take-up reel, the tape winding force of the supply reel, the coil diameter of the tape coiled on the supply reel and the rotating speed of the supply reel. It has been ascertained through tests that, in cases where the wrapping angle of the magnetic tape formed with the drum is large, the tape winding force required increases accordingly as the magnetic tape rewinding speed increases. The tape winding force and the tape rewinding speed must be within a range indicated by hatching in the first quadrant part of FIG. 1. In a case where the rotation torque of the supply reel is arranged to be constant, the tape winding force of the supply reel is inversely proportional to a tape coil diameter obtained on the supply reel, as indicated in the second quadrant part of FIG. 1. The tape winding force decreases as the tape coil diameter is large. Further, as shown in the third quadrant part of FIG. 1, the rotating speed of the supply reel is in inverse proportion to the tape coil diameter and in direct proportion to the tape winding force.

While there are the above-stated relations, the conventional VTR has been arranged as follows: The tape rewinding speed is set at a fixed low speed as indicated by a characteristic curve "c" in the first quadrant part of FIG. 1 according to the tape rewinding speed obtained when the tape coil diameter is large while requiring a smaller winding force as shown by the one-dot-chain line in FIG. 1, and the capstan is arranged to be rotated at a given speed corresponding to this fixed low speed.

However, the tape can be rewound at a higher speed with a larger tape winding force while the tape coil is still in a stage of a small diameter. Whereas, the conventional arrangement has necessitated an unduly long period of time in rewinding, as the rewinding speed is fixedly set at the low speed. This inconvenience has existed not only in rewinding the tape but also in fast feeding the tape at a fast speed.

SUMMARY OF THE INVENTION

It is, therefore, an object of this invention to provide a magnetic recording and reproducing apparatus of the above-stated kind which is arranged to be capable of solving the above-stated problem of the prior art.

To attain this object, a magnetic recording and reproducing apparatus which embodies this invention and is of the kind arranged to be loaded with a magnetic tape spanning and wound between and around a supply reel and a take-up reel, to transport the magnetic tape from the supply reel to the take-up reel by driving and rotating forward the two reels and a capstan and to rewind the tape moving it from the take-up reel back to the supply reel by rotating them backward, with the tape pushed into contact with the capstan, comprises: detecting means for detecting the rotating speed of the supply reel in rewinding the tape; and control means for varying the rotating speed of the capstan according to the rotating speed of the supply reel detected by the detecting means during the process of rewinding the tape.

The embodiment which is arranged in this manner is capable of controlling and varying the rotating speed of the capstan according to the rotating speed of the supply reel which is in direct proportion to a tape winding force required in rewinding the magnetic tape, so that the tape can be rewound within a short period of time as the tape rewinding speed is not restricted to a fixed low speed.

The above and other objects and features of the invention will become apparent from the following detailed description of an embodiment thereof taken in connection with the accompanying drawings.

6 is a diagram showing the characteristic of control which is performed over the rotating speed of a capstan according to the rotating speed of the supply reel obtained in rewinding the tape.

DETAILED DESCRIPTION OF THE PREFERRED EMBODIMENT

The details of a VTR which is arranged as an embodiment of this invention are described below with reference to the accompanying drawings. The invention is applied to the magnetic tape transport control system of the VTR.

Figure 2:
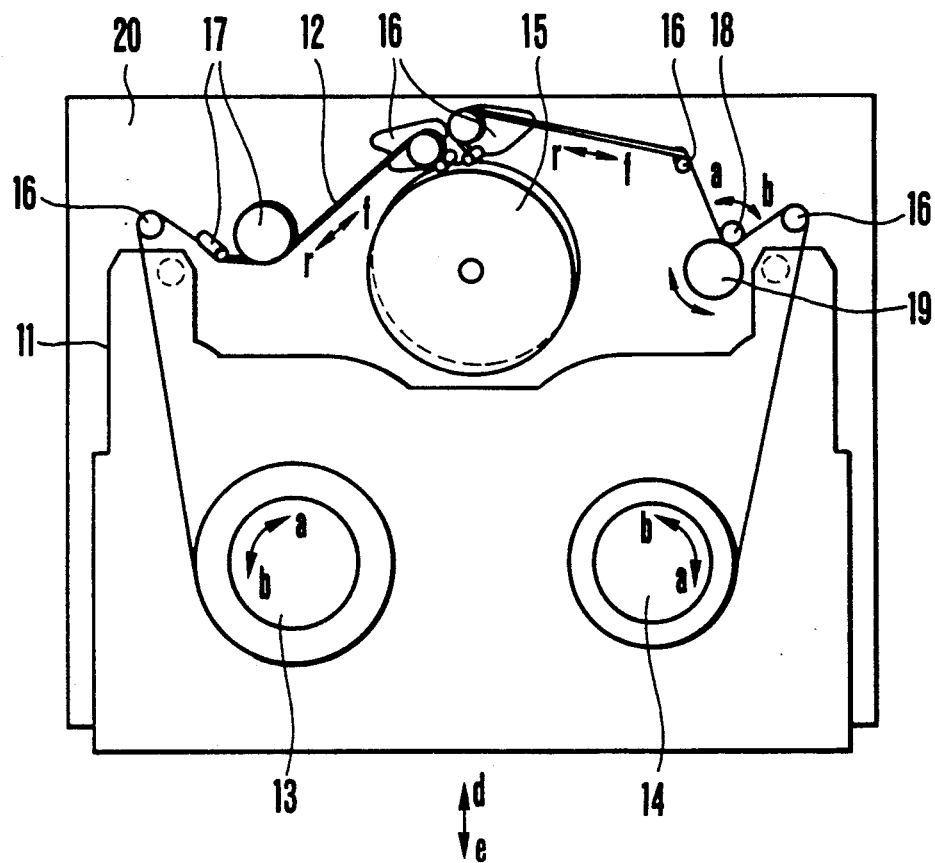
FIG. 2 is a plan view schematically showing the arrangement and operation of the magnetic tape driving transport system of a VTR which is arranged according to this invention as an embodiment thereof.

FIG. 2 shows the arrangement of the magnetic tape driving transport system of the VTR as in a state of having the magnetic tape driven to travel. In FIG. 2, a reference numeral 11 denotes a cassette. Within the cassette 11, a magnetic tape 12 is wound around a supply reel 13 and a take-up reel 14 in a state of spanning a space between these reels. The cassette 11 is removably loaded on the VTR. Magnetic heads which are not shown are rotatably arranged along the periphery of a rotary drum 15. A sliding mechanism which is not shown is arranged to be capable of sliding the cassette 11 toward and away from the drum 15 in the directions of arrows "d" and "e". The cassette 11 is thus arranged to be shiftable to a position close to the drum 15 by sliding it in the direction of arrow "d" when the VTR is loaded with the magnetic tape 12.

A plurality of tape guide members 16 and 17 are arranged to define a traveling path for the magnetic tape 12 by coming into contact with the magnetic tape 12. The guide members 16 are movable, while the guide members 17 are stationary. In loading the VTR with the magnetic tape 12, a mechanism which is not shown moves the guide members 16 from their lower positions to their positions shown in FIG. 2. The guide members 16 are moved in such a way that the magnetic tape 12 is pulled out of the cassette 11 and is wrapped around the drum 15 in a loading position.

A capstan 18 is arranged to rotate for moving the magnetic tape 12. A pinch roller 19 is arranged to be movable to a position of being pushed against the capstan 18 as shown in FIG. 2 when the magnetic tape 12 is driven to travel. A numeral 20 denotes a chassis of the VTR.

With the VTR arranged in this manner, the magnetic tape 12 is arranged to be driven to travel by the rotations of the supply reel 13, the take-up reel 14 and the capstan 18 in recording or reproduction, in rewinding the tape 12 and also in fast feeding the tape 12.

In recording or reproduction and in fast feeding the magnetic tape 12, the capstan 18 and the take-up reel 14 are driven to rotate forward in the direction of arrow "a". This causes the supply reel 13 to rotate in the same direction to pull the tape 12 from the supply reel 13. The tape 12 is moved forward in contact with the drum 15 in the direction of arrow "f" to be taken up on the take-up reel 14. Then, recording or reproduction is performed when the magnetic heads which are not shown are rotated along with the periphery of the drum 15 in sliding contact with the magnetic tape 12.

In rewinding the tape 12, the supply reel 13 and the capstan 18 are driven to rotate backward in the direction of arrow "b". This causes the take-up reel 14 to rotate in the same direction to allow the tape 12 to be pulled from the take-up reel 14 in the direction of arrow "r" to be thus taken up back on the supply reel 13.

Figure 3:
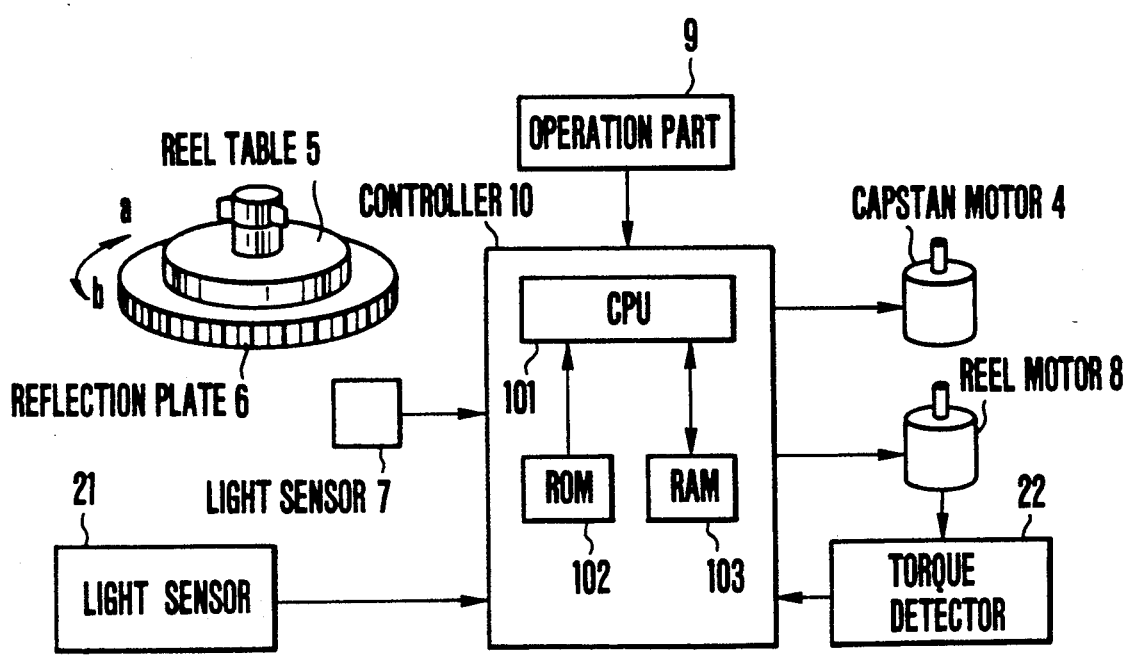
FIG. 3 is a block diagram showing the arrangement of the magnetic tape driving control system of the same VTR.

In the case of the embodiment, the rotating speed of the supply reel 13 in the direction of "b" or "a" is detected in rewinding or fast feeding the tape 12; and the rotating speed of the capstan 18 in the direction of "b" or "a" is variably controlled according to the rotating speed of the supply reel 13 detected. For this function, the magnetic tape driving control system of the VTR is arranged as described below with reference to FIG. 3:

Referring to FIG. 3, a controller 10 is arranged to control the whole VTR. The controller 10 includes a CPU 101 which is composed of a microprocessor element and a microcomputer which is composed of a ROM 102 and a RAM 103. The ROM 102 and the RAM 103 are connected to the CPU 101. An operation part 9 is provided for giving various instructions to the controller 10 for loading, recording, reproduction, rewinding, unloading, etc.

The controller 10 is connected, via driving circuits which are not shown, to a capstan motor 4 which is arranged to rotate the capstan 18 and to a reel motor 8 which is arranged to rotate a reel table 5. These motors are thus under the control of the controller 10. The reel table 5 is arranged to be driven by the reel motor 8 to rotate in the direction of arrow "a" or "b". A known torque limiting mechanism is arranged between the reel table 5 an d the reel motor 8 to cause the reel table 5 to rotate at a constant torque. The supply reel 13 is carried by the reel table 5 and is arranged to be rotatable also in both the above-stated directions accordingly as the reel table 5 is rotated.

Figure 4:
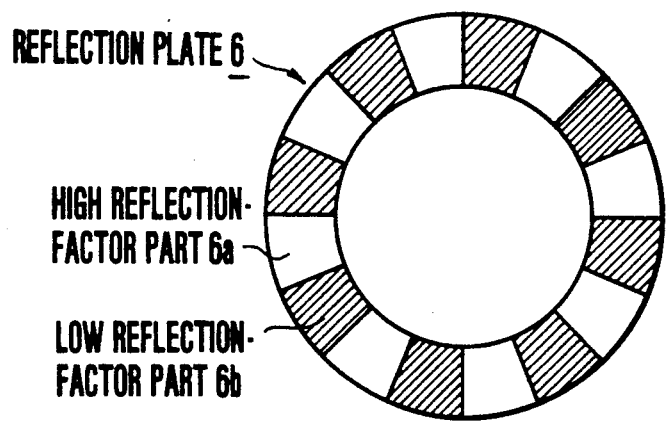
FIG. 4 is a bottom plan view showing the lower side of a reflection plate shown in FIG. 3.

A ring-shaped reflection plate 6 which is shown in FIG. 4 is secured to the lower side of the reel table 5. The lower side surface of the reflection plate 6 is composed of high reflection-factor parts 6a and low reflection-factor parts 6b. These parts 6a and 6b are alternately arranged in the circumferential direction of the reel table 5 at a given pitch respectively.

A reflection-type light sensor (photo coupler) 7 is disposed in the neighborhood of the lower side surface of the reflection plate 6. The reflection plate 6 rotates accordingly as the reel table 5 rotates. The high reflection-factor parts 6a and the low reflection-factor parts 6b alternately pass above the light sensor 7. The reflection factor of the reflection plate 6 thus changes alternately between the high and low reflection factors. The light sensor 7 then generates a pulse signal corresponding to this change. The pulse signal thus generated is supplied to the controller 10. The controller 10 detects the rotating speed of the supply reel 13 through the rotating speed of the reflection plate 6, i.e., the reel table 5, by counting the pulses of the pulse signal or by measuring the period or the frequency of the pulse signal.

Another reel table which rotatably carries the take-up reel 14 is omitted from FIG. 3. This reel table is arranged to be rotated either by the reel motor 8 or by another motor (not shown) under the control of the controller 10. With the reel table rotated, the take-up reel 14 which is disposed thereon is also rotated. Meanwhile, there are provided driving parts for other mechanisms of the VTR which are also under the control of the controller 10. They are omitted from illustration.

With the VTR arranged as described above, the CPU 101 of the controller 10 controls the whole VTR by processing various data and signals while using the RAM 103 for a working area or the like according to a control program and control data stored in the ROM 102.

The control data relates to the rotating speed of the capstan which is rotated according to the rotating speed of the supply reel. The rotating speed of the capstan is set at a given value according to the detected rotating speed of the supply reel.

Figure 6:
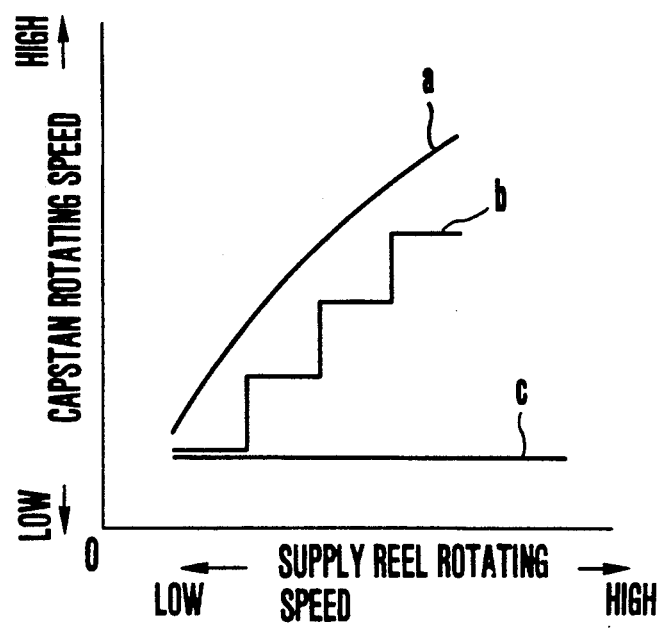
Figure 5:
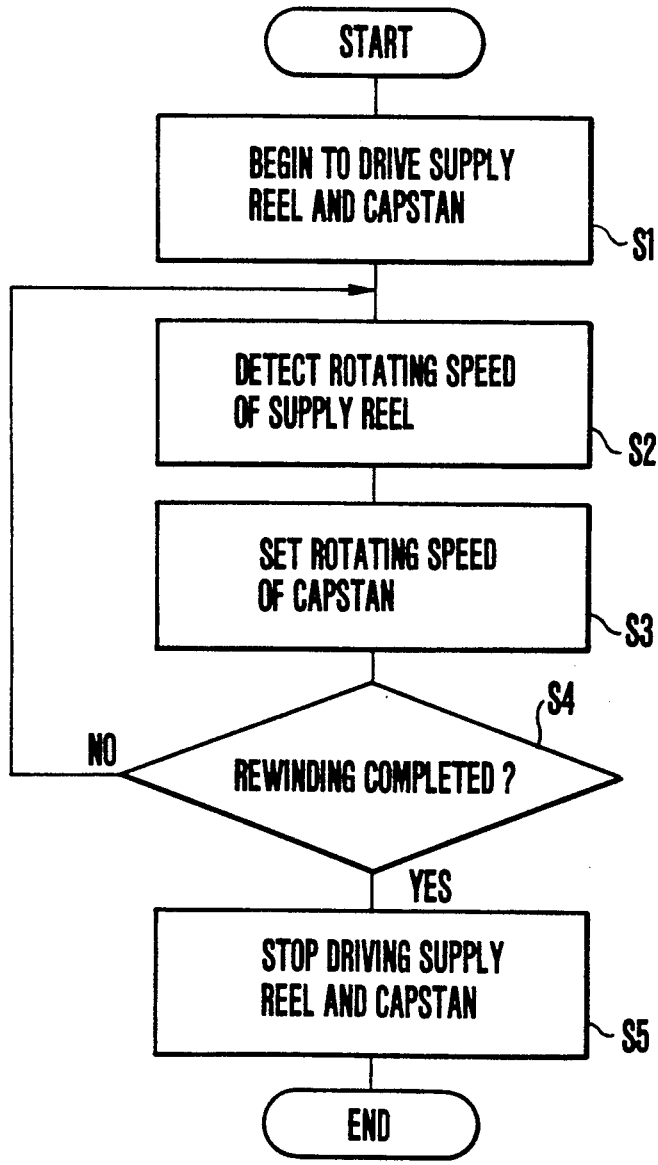
FIG. 5 is a flow chart showing control procedures for a magnetic tape rewinding action. FIG.

In rewinding or fast feeding the magnetic tape 12, an instruction is given from the operation part 9 to the controller 10. In response to the instruction, the CPU 101 performs control in accordance with procedures which are as described below with reference to FIG. 5:

The control operation for tape rewinding is first described. At a step S1: The capstan motor 4 and the reel motor 8 are turned on. The supply reel 13 and the capstan 18 begin to be rotated in the direction of arrow "b" for rewinding the tape. At a step S2: The rotating speed of the supply reel 13 is detected through the pulse signal output from the light sensor 7. Step S3: The driving condition of the capstan motor 4 is controlled and adjusted according to the rotating speed of the supply reel 13 detected at the step S2. The rotating speed of the capstan 18 is thus variably set. The rotating speed of the capstan 18 in this instance is increased accordingly as the rotating speed of the supply reel 13 increases. For example, these two speeds are controlled either to continuously vary approximately in direct proportion, as indicated by a characteristic curve "a" shown in FIG. 6, or to vary stepwise as indicated by a characteristic curve "b". In FIG. 6, a characteristic curve "c" represents the control characteristic of the conventional VTR described in the foregoing.

Step S4: A check is made for completion of tape rewinding. The check is made either through receipt of a rewinding action ending instruction from the operation part 9 or through a tape end detection signal from a sensor which is not shown. If the tape rewinding action is found not to have been completed as yet, the steps S2, S3 and S4 are repeated in a loop like manner. The loop is arranged to be repeated in a suitable short period.

Upon completion of the tape rewinding action, the flow of operation comes to a step S5 to bring the flow of operation to an end by turning off the reel motor 8 and the capstan motor 4.

Figure 1:
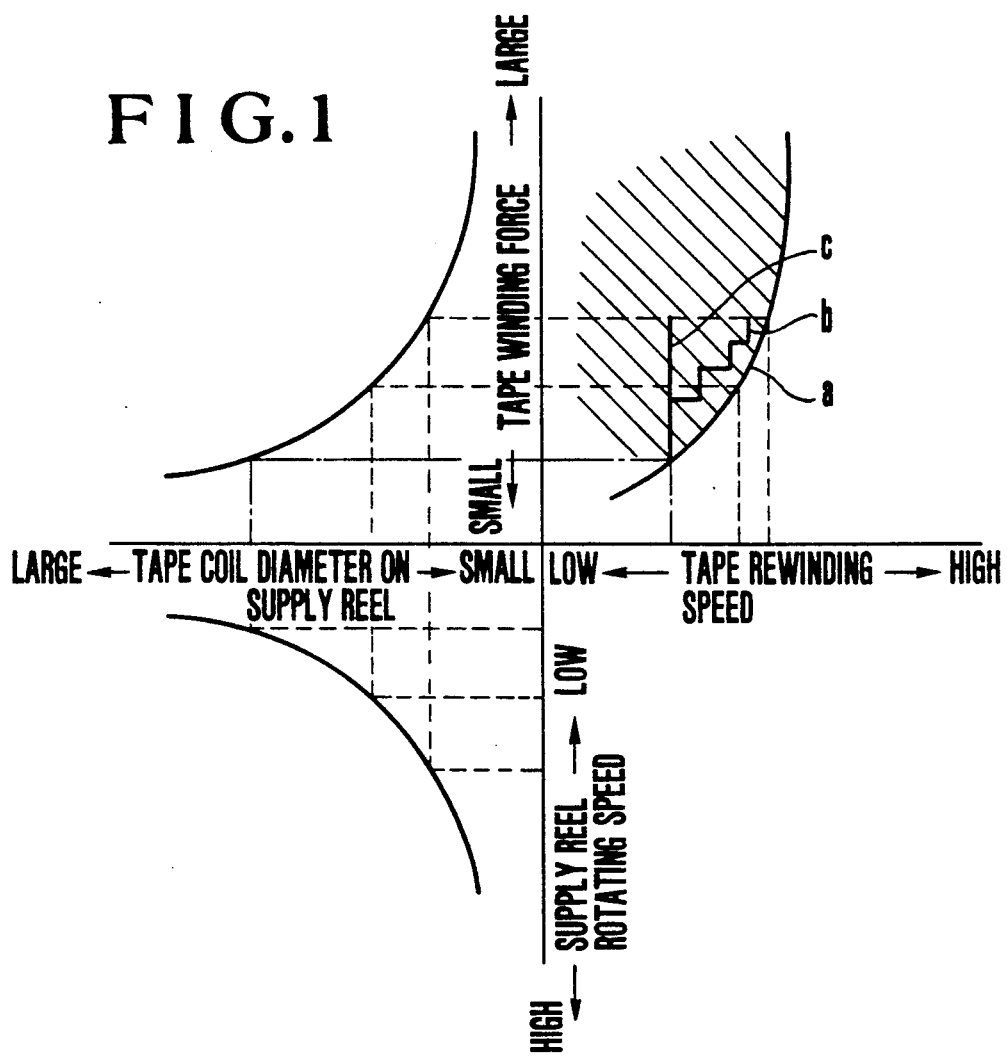
FIG. 1 is a diagram showing relations obtained among a magnetic tape rewinding speed, a tape winding force, a tape coil diameter obtained on a supply reel and the rotating speed of the supply reel.

In rewinding the magnetic tape 12, as described above, this embodiment controls the rotating speed of the capstan 18 according to the rotating speed of the supply reel 13 in a manner as indicated by the characteristic curve "a" or "b" of FIG. 6. Unlike the conventional VTR, this control arrangement enables the rewinding speed of the supply reel 13 to be controlled under the control as indicated by the characteristic curve "a" or "b" in the first quadrant part of FIG. 1, because the rotating speed of the capstan 18 is not limited to a low speed according to the rotating speed of the supply reel 13. As apparent from comparison with the characteristic curve "c" of the conventional VTR, the tape rewinding speed of this embodiment is higher than the conventional tape rewinding speed while the tape coil diameter on the supply reel 13 is less than the value indicated by the one-dot-chain line in FIG. 1. The length of time required with the conventional VTR in rewinding the magnetic tape 12 thus can be shortened by the embodiment.

While the light sensor is employed as a detecting means for detecting the rotating speed of the supply reel 13 in the case of the embodiment described, the invention is of course not limited to the use of the light sensor. Some other element such as an MR element or the like may be used in place of the light sensor. A tape counter which is generally used for VTRs also may be used for the above-stated purpose.

Further, in the embodiment described, the rotating speed of the capstan 18 is set after detecting the rotating speed of the supply reel 13. However, this arrangement may be changed to detect the coil diameter obtained on the side of the supply reel and to set the rotating speed of the capstan on the basis of the tape coil diameter detected. In that instance, the tape coil diameter is detectable by means of the light sensor 21 shown in FIG. 3.

The light sensor 21 consists of light emitting elements which are disposed, for example, in the diametral direction of the reel table 5; and a long light receiving element which is opposed to these light emitting elements across a rewound part of the tape. The light sensor 21 is thus arranged to detect the coil diameter of the tape through a shadow of the coiled part of the tape formed on the light receiving element. In that instance, control data relative to the rotating speeds of the capstan corresponding to the coil diameter values of the tape are stored in the ROM 102 of the above-stated controller 10.

Further, a torque detector 22 may be arranged, as shown in FIG. 3, at the above-stated reel motor 8 to detect a tape winding force, while the above-stated torque limiting mechanism is removed. Then, the rotating speed of the capstan may be set according to the detected tape winding force. In this instance, control data relative to the tape winding force and the rotating speed of the capstan are stored in the ROM 102.

As apparent from the foregoing description, this invention is applied to a magnetic recording and reproducing apparatus of the kind arranged to be loaded with a supply reel and a take-up reel with a magnetic tape spanning a space between these reels and being wound around them; to transport the magnetic tape from the supply reel to the take-up reel by rotating forward the two reels and a capstan with the tape pushed into contact with the capstan; and to rewind the magnetic tape moving it from the take-up reel back to the supply reel by rotating the reels and the capstan backward. This embodiment comprises means for detecting the rotating speed of the supply reel or means for detecting the diameter of a tape coil obtained on the supply reel, or means for detecting a tape winding force during the process of rewinding the tape; and control means for controlling and variably adjusting the rotating speed of the capstan during the rewinding of the tape according to the detection output of the detecting means. This arrangement enables the embodiment to carry out a rewinding action on the magnetic tape within a short period of time.

What is claimed is:

1. A recording and reproducing apparatus comprising:
   (a) a supply reel and a take-up reel for supplying and taking up a tape;
   (b) reel driving means for driving said two reels;
   (c) a capstan;
   (d) capstan driving means for driving said capstan to transport the tape from said supply reel to said take-up reel in a forward tape transporting mode, and rewinding the tape from said take-up reel to said supply reel in a backward tape transporting mode;

(e) detecting means for detecting the rotating speed of said supply reel in rewinding the magnetic tape; and (f) control means for controlling and varying the rotating speed of said capstan, during a tape rewinding mode, according to the rotating speed of said supply reel detected by said detecting means.

2. An apparatus according to claim 1, wherein said detecting means includes a photo sensor.

3. An apparatus according to claim 1, wherein said control means includes a microcomputer.

4. A recording and/or reproducing apparatus comprising:

(a) a supply reel and a take-up reel around which a tape is wound;

(b) transport means for transporting the tape between said two reels;

(c) detecting means for detecting a parameter which corresponds to the transport speed of the tape; and (d) control means for controlling and varying the transport speed of the tape transported by said transport means in a predetermined mode according to a detection output of said detecting means.

5. An apparatus according to claim 4, wherein said transport means includes a capstan.

6. An apparatus according to claim 4, wherein said transport means includes driving means for driving at least one of said two reels and a capstan.

7. An apparatus according to claim 4, wherein said parameter relates to the rotating speed of one of said two reels.

8. An apparatus according to claim 4, wherein said parameter relates to the coil diameter of the tape coiled on one of said two reels.

9. An apparatus according to claim 4, wherein said parameter functionally relates to the winding force of one of said two reels exerted on the tape.

10. An apparatus according to claim 4, wherein said control means includes a microcomputer.

11. An apparatus according to claim 4, wherein said predetermined mode is a rewinding mode.

12. An apparatus according to claim 4, wherein said predetermined mode is a fast feeding mode.

13. A driving device comprising:

a) a reel member around which a tape-shaped recording medium is wound;

b) first driving means for transporting said tape-shaped recording medium;

c) second driving means for winding said tape-shaped recording medium transported by said first driving means by rotating said reel member;

d) detecting means for detecting a rotating state of said reel member; and e) control means capable of setting a first driving mode in which said first driving means is driven at a constant speed to transport said tape-shaped recording medium at a constant speed and a second driving mode in which the driving speed of said first driving means is varied according to an output of said detecting means.

14. A device according to claim 13, wherein, said tape-shaped recording medium is transported at a higher speed in said second driving mode than in said first driving mode.

15. A device according to claim 14, wherein said detecting means is arranged to detect the coil diameter of said tape-shaped recording medium wound around said reel member by detecting the rotating speed of said reel member, and wherein the driving speed of said first driving means is controlled and varied according to an output of said detecting means.

16. A device according to claim 15, wherein said first driving means includes a capstan.

17. A device according to claim 15, wherein said reel member is one of a pair of reel members around which said tape-shaped recording medium is wound.

* * * * *